March 29, 1938.  H. J. SANG  2,112,252
ADJUSTING INDICATING SYSTEM FOR MEASURING INSTRUMENTS
Filed Jan. 7, 1937
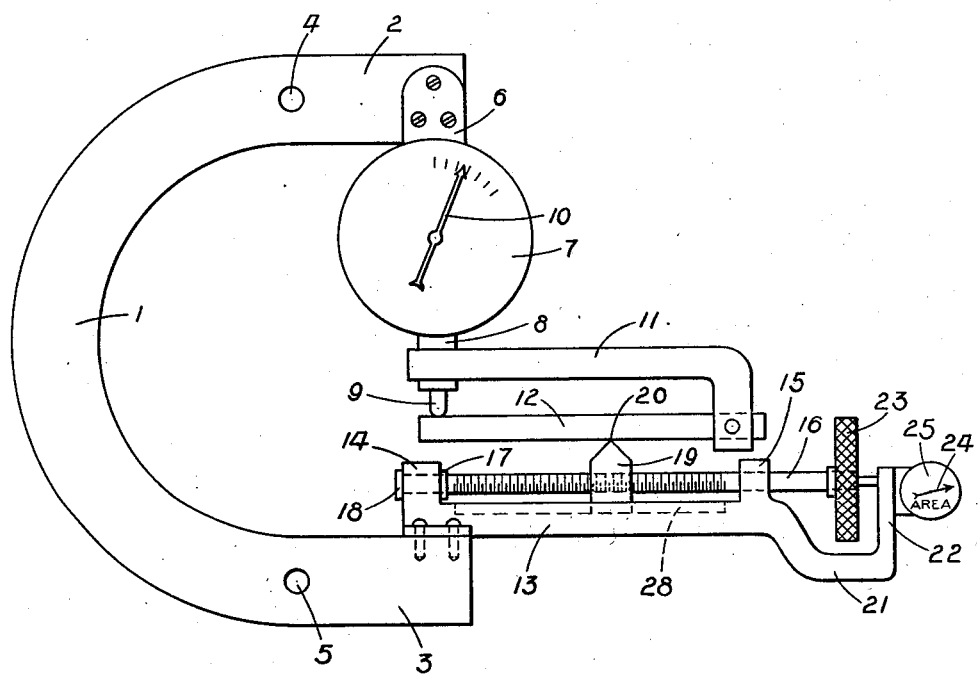
INVENTOR
HENRY J. SANG
BY
*Robert A. Lavender*
ATTORNEY Patented Mar. 29, 1938

2,112,252

UNITED STATES PATENT OFFICE 2,112,252

ADJUSTING INDICATING SYSTEM FOR MEASURING INSTRUMENTS

Henry J. Sang, Philadelphia, Pa.

Application January 7, 1937, Serial No. 119,408

12 Claims. (Cl. 265—63)

(Granted under the act of March 3, 1883, as amended April 30, 1928; 370 O. G. 757)

This invention relates to means for varying the sensitivity of the indicator on a measuring device whereof the functioning depends upon relative movement of two parts proportional to the quantity to be measured.

It is the object of my invention to provide means for varying the sensitivity of the indicator of measuring devices of the type above mentioned and also to provide means for indicating the load per unit area, or stress, when the quantity to be measured is a load applied to a specimen being tested.

The drawing depicts a form of my invention that has proved very satisfactory.

While the present invention is shown and described as associated with a loop dynamometer, I wish it to be understood that its field of usefulness is not restricted thereto but that it may be used in connection with any type of measuring instrument wherein there is relative movements of two parts proportional to the quantity to be measured.

Referring to the drawing, the numeral 1 designates a dynamometer loop provided in its limbs 2 and 3 with the holes 4 and 5, respectively, for applying the load to the loop. Fixed to the limb 2 is a member designated generally by the numeral 6 that comprises the dial 7 and a guide sleeve 8 wherein is slideably mounted the rod 9 to cause index 10 to move over dial 7. The operating connection between rod 9 and index 10 may be of any of the numerous types of devices known and used for this purpose and since this forms no part of my invention it has not been illustrated in the drawing. The dial 7 is graduated into any suitable number of divisions, which number may for convenience in the ensuing discussion be assumed as 100. Fixed to a sleeve 8 is an arm 11 that preferably extends parallel to the limbs of the loop, having its end remote from the sleeve 8 laterally turned, and to this laterally turned portion is pivoted one end of a lever 12 whereof the other or free end is in contact with the inner end of the rod 9.

Fixed to the limb 3 is a bracket 13, extending parallel to arm 11, provided with apertured lugs 14 and 15 in which is rotatably mounted a screw 16, longitudinal movement of this screw being prevented by collars 17 and 18. The face of bracket 13 adjacent screw 16 has formed in it a channel 28 in which is slideable the flat base of a travelling nut 19 provided on its opposite face with a knife edge 20 that contacts the face of lever 12 opposite the face thereof that contacts rod 9. The bracket 13 is formed with an offset portion 21 and an outwardly turned portion 22 to support the screw 16 on opposite sides of wheel 23 that is fixed to screw 16 to turn the same, an extension of the screw being connected to pointer 24 on indicator 25 to rotate the pointer over the indicator dial. The driving connection between screw 16 and the pointer 24 is such that the pointer makes a complete rotation over the dial of indicator 25 when the nut 19 is traversed from one end of the threaded portion of screw 16 to the other.

It is apparent that when the relative positions of the limbs 2 and 3 are changed by application of a load to the loop 1 the arm 11, and consequently lever 12, will be moved with respect to the bracket 13 and that the extent of movement of that end of lever 12 in contact with rod 9 will depend upon the position of the fulcrum formed by knife edge 20. If the knife edge 20 were directly in line with the axis of rod 9 the movement imparted to the rod by a change in the relative positions of arm 11 and bracket 13 would be transmitted to the rod 9 without change, it being of course understood that the rod 9 is suitably biased to follow the lever 12 when the end of the lever in contact with rod 9 is moved in a direction away from the dial 7. If the knife edge 20 be set at a position halfway between the pivot of lever 12 and the axis of rod 9 the rod will be moved through twice the distance that the pivot moves with respect to bracket 13, and if the position of the knife edge be such that the ratio of the distance from the pivot of lever 12 to the center of rod 9 is 10 times the distance from the pivot to knife edge 20 then the rod will be moved 10 times as far as the relative movement between the pivot and bracket 13. It will, therefore, be seen that the dial of indicator 25 may be graduated to indicate the distance of knife edge 20 from the pivot of lever 12 in terms of a fraction of the entire effective length of lever 12, since the pointer 24 makes one revolution for a complete traverse of the nut 19 along screw 16.

If we assume that the maximum load that may be safely applied to the loop is 2,000 pounds then each of the graduation divisions on dial 7 will represent 20 pounds when there is a one to one ratio of movement between the two ends of lever 12 and that if the knife edge 20 be set midway of the effective length of the lever 12 then the relative movement between arm 11 and bracket 13 will be multiplied by two when it is transmitted to rod 9, index 10 will be moved twice as far for any given load as when the one to one ratio is used, and therefore a graduation division on dial 7 will represent 10 pounds. Thus, the index 10 may be made to execute a complete rotation over the dial 7 for any applied load merely by adjusting the position of knife edge 20 and for small loads the sensitivity of the indication on dial 7 is increased in the same ratio as the movement of index 10 for a given load is increased.

A further use may be made of my invention in that it can be utilized for indicating the stress, or load per unit area of a specimen being tested, and the indicator 25 may be calibrated in terms of area, within the limits of loading of any particular loop. That this is so will appear from a consideration of the operation above set forth. Let us assume, as heretofore, that the maximum load that may be represented by a graduation division on dial 7 is 20 pounds. It is apparent that knife edge 20 may be so adjusted that each graduation division on dial 7 will represent 14 pounds and the pointer 24 will indicate a definite position on indicator 25 when the knife edge is set at the point corresponding to this load value of a division on dial 7. Assume that the specimen under test has an area of 14 units of area, then by setting the knife edge at such position that pointer 24 indicates 14 it is apparent that the indication of index 10 on dial 7 will be the load per unit area. That is, if index 10 rotates to division 69 on dial 7 the total load will be the number of divisions times the load represented by each division, which is 69×14, but the stress is the total load divided by the number of units of area to which the load is applied and this will be, in the example used, 69×14 divided by 14 which is simply 69. Thus, by calibrating the dial of indicator 25 in terms of the load represented by one division on dial 7 corresponding to the position of knife edge 20 as shown by pointer 24, the indicator 25 is in effect calibrated in terms of the area under test and the reading on dial 7 will be the load per unit area.

It is apparent from the foregoing description that the invention can accomplish the division of one quantity by another quantity, the quotient being indicated on the dial 7. In the embodiment used for the purpose of illustration, the dividend was expressed in units of load, the divisor in units of area, and the quotient in units of load divided by area, that is to say, stress.

If, therefore, the invention described herein be set up in such a manner that the relative movement between parts 2 and 3 is caused to change proportionally to one set of units, and the screw 16 is caused to move proportionally to another set of units, then the dial 7 may be calibrated to read in terms of the first named units divided by the last named units.

The invention herein described and claimed may be used and/or manufactured by or for the Government of the United States of America for governmental purposes without the payment of any royalties thereon or therefor.

I claim:

1. Apparatus as described, comprising a dynamometer loop having two substantially parallel limbs, a member including a graduated dial and a guide sleeve disposed between said limbs and fixed to one thereof, an index mounted to be rotatable over said dial, means connected to said index to rotate the same including a rod slideable in said sleeve and extending beyond the inner end of said sleeve, an arm fixed at one end to said sleeve and having its other end portion laterally turned toward the other limb, a lever pivoted at one end to said laterally turned portion and extending to contact the said end of said rod whereby said index is actuated proportionally to movement of said lever, a bracket fixed to said other limb on the line of the axis of said rod and extending parallel to said arm, a screw mounted in said bracket to permit rotation but not translation of said screw, a travelling nut on said screw having one face in slideable contact with said bracket and on the opposite face a knife edge contacting said lever, and an indicating device operatively connected to said screw to show the ratio of the distance between the pivot of the lever and the knife edge to the distance between the pivot and the axis of said rod.

2. Apparatus as described, comprising a dynamometer loop having two substantially parallel limbs, a member including a graduated dial and a guide sleeve disposed between said limbs and fixed to one thereof, an index mounted to be rotatable over said dial, means connected to said index to rotate the same including a rod slideable in said sleeve and extending beyond the inner end of said sleeve, an arm fixed at one end to said sleeve and having its other end portion laterally turned toward the other limb, a lever pivoted at one end to said laterally turned portion and extending to contact the said end of said rod whereby said index is actuated proportionally to movement of said lever, a bracket fixed to said other limb extending parallel to said arm, a member having a knife edge in contact with the face of said lever opposite said rod slideably mounted on said bracket, means to move said member uniformly along said bracket, and means operated by said means to indicate the proportion of the effective length of said lever lying between said knife edge and the pivot of said lever.

3. Apparatus as described, comprising a dynamometer loop having two substantially parallel limbs, a member including a graduated dial and a guide sleeve disposed between said limbs and fixed to one thereof, an index mounted to be rotatable over said dial, means connected to said index to rotate the same including a rod slideable in said sleeve and extending beyond the inner end of said sleeve, an arm fixed at one end to said sleeve and having its other end portion laterally turned toward the other limb, a lever pivoted at one end to said laterally turned portion and extending to contact the said end of said rod whereby said index is actuated proportionally to movement of said lever, a bracket fixed to said other limb on the line of the axis of said rod and extending parallel to said arm, the pivot of said lever and said bracket being relatively movable by load applied to said loop, means carried by said bracket to cooperate with said lever to cause the free end of said lever to execute movement having any desired ratio to the absolute value of any relative movement between said pivot and said bracket, and means operatively associated with the said means to indicate the said ratio.

4. Apparatus as described, comprising a dynamometer loop having two substantially parallel limbs, a member including a graduated dial and a guide sleeve disposed between said limbs and fixed to one thereof, the maximum value of the load representable by a graduation division on said dial being fixed by the characteristics of said loop, an index mounted to be rotatable over said dial, means connected to said index to rotate the same including a rod slideable in said sleeve and extending beyond the inner end thereof, an arm fixed at one end to said sleeve and having its other end laterally turned toward the other limb, a lever pivoted at one end to said laterally turned portion and extending to contact said end of said rod whereby said index is actuated proportionally to movement of said lever, a member having a knife edge in contact with the side of said lever opposite said rod, means to move said member along said lever parallel to said arm, and means operated by said means to move said member to indicate the fraction of said maximum load represented by a graduation division on said dial corresponding to the position at which said knife edge is set.

5. Apparatus as described, comprising an element having two portions relatively movable proportionally to the load applied thereto, a bracket secured to one of said portions, a fulcrum element slidably mounted on said bracket, a member including a guide sleeve fixed to the other of said portions and lying between the said two portions, a graduated dial on said member, an index mounted to rotate over said dial, means to actuate said index including a rod in said sleeve, a support fixed to said member to extend parallel to said bracket, a lever pivoted at one end to said support and having its other end portion in contact with the end of said rod, the face of said lever opposite said rod being in contact with said fulcrum, means to move said fulcrum along said bracket, and indicating means actuated by the last mentioned means to show the units of load represented by a graduation division on said dial corresponding to any position at which said fulcrum is set.

6. Apparatus as described, comprising an element having two portions relatively movable proportionally to the load applied thereto, a bracket secured to one of said portions, a fulcrum element slidably mounted on said bracket, a member including a guide sleeve fixed to the other of said portions and lying between the said two portions, a graduated dial on said member, an index mounted to rotate over said dial, means to actuate said index including a rod in said sleeve, and means to transmit to said rod any relative movement between said portions modified by a proportionality factor that is dependent upon the position of said fulcrum.

7. Apparatus as described, comprising an element having two portions relatively movable proportionally to the load applied thereto, indicating means fixed to one of said portions, means to actuate said indicating means proportionally to relative movement between said portions, said actuating means including adjustable elements to modify by a predetermined proportionality factor the actuation of said indicating means due to relative movement of any given magnitude betwen said portions, and means to indicate the value of said proportionality factor.

8. Apparatus as described, comprising an element having two portions relatively movable proportionally to the load applied thereto, indicating means fixed to one of said portions, means to actuate said indicating means proportionally to relative movement between said portions, said actuating means including adjustable elements to modify by a predetermined proportionality factor the actuation of said indicating means due to relative movement of any given magnitude between said portions, and means to indicate the units of load represented by a unit actuation of said indicating means.

9. Apparatus as described, comprising an element having two portions relatively movable proportionally to the load applied thereto, a bracket secured to one of said portions, a fulcrum element slideably mounted on said bracket, load indicating means associated with the other of said portions, and means likewise associated with said other portion and also with said fulcrum to actuate said indicating means in response to relative movement between said portions, such actuation being modified by a proportionality factor dependent upon the position of said fulcrum.

10. Apparatus as described, comprising an element having two portions relatively movable proportionally to the load applied thereto, a bracket secured to one of said portions, a fulcrum element slidably mounted on said bracket, load indicating means associated with the other of said portions, and means associated with said fulcrum to indicate the units of load represented by unit actuation of the load indicating means for each setting of said fulcrum.

11. Apparatus as described, having two portions, relatively movable with respect to each other along a predetermined line, indicating means fixed to one of said portions, means associated with said indicating means and with the other of said portions to actuate said indicating means proportionally to relative movement between said portions, said associated means including adjustable elements to modify by a proportionality factor the actuation of said indicating means due to relative movement of any given magnitude between said portions, said proportionality factor being dependent upon the position of said adjustable elements.

12. Apparatus as described, having two portions relatively movable with respect to each other, along a predetermined line, a bracket secured to one of said portions, a fulcrum element slidably mounted on said bracket, a member including a guide sleeve fixed to the other of said portions and lying betwen the two said portions, a graduated dial on said member, an index mounted to rotate over said dial, means to actuate said index, including a rod in said sleeve, and means to transmit to said rod any relative movement between said portions modified by a proportionality factor that is dependent upon the position of said fulcrum.

HENRY J. SANG.

CERTIFICATE OF CORRECTION.

Patent No. 2,112,252. March 29, 1938.

HENRY J. SANG.

It is hereby certified that error appears in the above numbered patent requiring correction as follows: In the grant, and in the heading to the drawing and specification, title of invention, for the word "Adjusting" read Adjustable; and that the said Letters Patent should be read with this correction therein that the same may conform to the record of the case in the Patent Office.

Signed and sealed this 10th day of May, A. D. 1938.

(Seal)

Henry Van Arsdale,
Acting Commissioner of Patents.